Figure 1:
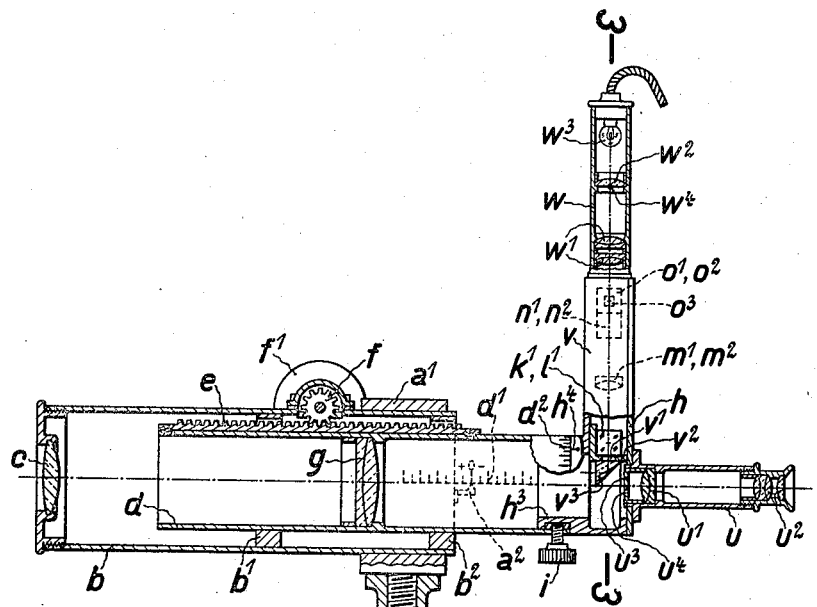

May 27, 1924.                                                              1,495,481
O. HENKER
APPARATUS FOR MEASURING THE REFRACTIVE VALUE OF THE
PRINCIPAL POINT OF THE EYE
Filed Dec. 23, 1922

Inventor:
Otto Henker

Patented May 27, 1924.

1,495,481

UNITED STATES PATENT OFFICE.

OTTO HENKER, OF JENA, GERMANY, ASSIGNOR TO THE FIRM OF CARL ZEISS, OF JENA, GERMANY.

APPARATUS FOR MEASURING THE REFRACTIVE VALUE OF THE PRINCIPAL POINT OF THE EYE.

Application filed December 23, 1922. Serial No. 608,785.

*To all whom it may concern:*

Be it known that I, OTTO HENKER, a citizen of Germany, and residing at Jena, Germany, have invented a new and useful Apparatus for Measuring the Refractive Value of the Principal Point of the Eye (for which I have filed an application in Germany December 27, 1921), of which the following is a specification.

The invention relates to an apparatus for the objective measurement of the refractive value of the principal point of the eye, i. e. the reciprocal value given in diopters of the distance of the far point from the front principal point of the eye. The method, which is of itself known and is that on which the novel apparatus is based, consists in this that by a collective lens system, which is displaceable in the axial direction, an image of a sighting mark is produced on the retina of the eye and that that position of this system is sought for, in which the lens of the eye to be examined produces a sharp image of the sighting mark on the retina. However, the fixing of that position of the observing device, in which the image presented in the ocular field of view is at its sharpest, is difficult. Hence, according to the invention a two-hole diaphragm and a separating prism system are introduced into the path of the rays transmitted to the eye so that the two partial images of the sighting mark, produced by this arrangement on the retina of the eye to be examined, will be brought into coincidence as soon as they are sharply imaged on the retina. The use of two separate partial images which are thus not superposed but are only contiguous with one another affords a very reliable adjustment for coincidence.

By means of the two-hole diaphragm, with central observation two ray pencil systems lying symmetrically to the optical axis are separated, each of which forms the corresponding partial image. By coincidence of the two partial images the refractive value of the principal point of the eye is thus obtained in the meridional plane of the eye, which passes through the centres of the two diaphragm images lying in the pupil of the eye. In order to be able to measure the refractive power in any meridian and thereby to ascertain the magnitude of astigmatic defects, that part of the apparatus facing the observer may, e. g., be arranged to rotate with the two-hole diaphragm and the illuminating aperture about the optical axis and be combined in a known manner with an arrangement permitting of the angle of the meridional plane set during measurement to be measured with the zero meridian.

For the observation of the two partial images of the sighting mark, produced on the retina, a magnifying observing instrument will preferably be used in a known way. With a view to attain in a particularly simple manner that the two partial images will be sharply seen, when coinciding on the retina, one couples the observing instrument for joint displacement to part of the collective system destined for imaging the sighting mark and causes the rays, reflected by the eye to be examined, to pass again through this part before entering the observing instrument.

Figure 2:
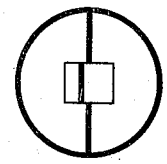
Figure 3:
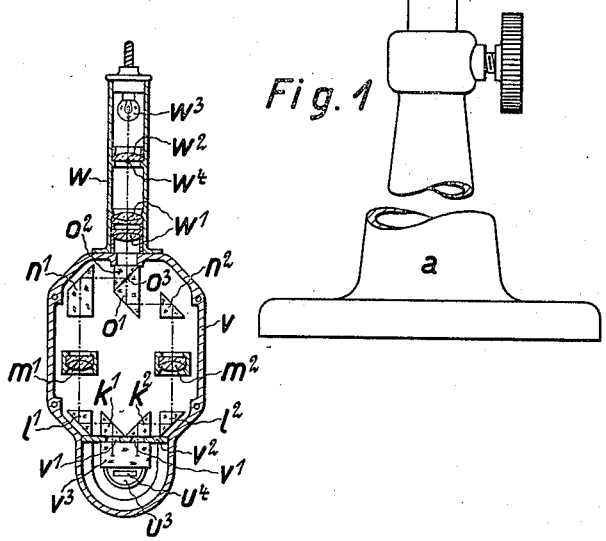

In the annexed drawing the invention is illustrated by a constructional example; Fig. 1 is a longitudinal section through the entire apparatus, Fig. 2 shows the image presented to the observer by the observing instrument, Fig. 3 is a section on line 3—3 of Fig. 1.

On an adjustable stand $a$ by means of a bearing body $a^1$ a horizontal tube $b$ is fixed, which has at its left-hand end a collective lens $c$. Within the tube $b$ there is a second, axially displaceable tube $d$, which is guided in two rings $b^1$ and $b^2$ connected with the tube $b$ and can be displaced relatively to the fixed tube $b$ by means of a rack $e$, a pinion $f$ and a milled head fixed to the axle of the latter. An index $a^2$ fixed to the bearing ring $b^2$ permits of the position at any time of the tube $d$ relative to the tube $b$ being read off on a scale $d^1$, which is attached to the outside of the tube $d$ and is numbered in diopters. About in the middle of the tube $d$ there is a collective system $g$, the distance of which from an end wall $h$ closing the tube $d$ at the right-hand end is equal to the focal length of $g$. To the end wall $h$ closing the displaceable tube $d$ at the right-hand end there are connected two parts of the casing, viz a horizontal part $u$ serving for the observation and a part $v$, destined for the presentation of the sighting mark and disposed perpendicularly to the axis of the tube d. Besides, the end wall $h$ is arranged so as to be rotatable together with the parts fixed to it by means of a lug $h^3$ projecting into the tube $d$ about the optical axis, while the tube $d$ itself is prevented from rotating about the optical axis by the rack $e$. For clamping the rotatable parts relatively to the tube $d$ a clamping screw $i$ is provided. The position at any time of the rotatable parts can be read off by means of an index $h^4$ on a scale $d^2$ on the outer surface of the tube $d$. The bottom end wall $v^2$ of the casing $v$ contains two openings $v^1$ which form the two-hole diaphragm. In front of this two-hole diaphragm there is disposed a reflecting prism $v^3$ which transmits the rays, traversing the two-hole diaphragm from above, into the direction of the axis of the tube $d$, the optical distance of the two-hole diaphragm from the system $g$ being equal to the focus of $g$. Behind each of the two apertures $v^1$ there is a reflecting prism $k^1$ and $k^2$ respectively, which, together with a further, similar reflecting prism $l^1$ and $l^2$ respectively displaces a traversing ray parallel to itself. Behind each of these prisms there is a lens system $m^1$ and $m^2$ respectively and furthermore a reflecting prism $n^1$ and $n^2$ respectively which deflects the path of rays again through 90°. A separating prism system disposed above consists of a right-angled reflecting prism $o^1$, on one cathetal side of which a second, smaller right-angled reflecting prism $o^2$ is cemented. In the middle of the cemented surface there is a small rectangular reflecting coating $o^3$. Within a tube $w$ fixed at the top of the casing $v$ there is a lens system $w^1$, composed of two members, a collective lens $w^2$ and an electric glow-lamp $w^3$. The collective lens $w^2$ carries at the bottom a sighting mark $w^4$ which consists of a dark line, running perpendicularly to the connecting line of the two-hole centres of the two-hole diaphragm $v^2$. The lens system $w^1$ images the surface of the collective lens $w^2$, illuminated by the glow-lamp $w^3$, with the linear mark in the upper common focal plane of the two lenses $m^1$ and $m^2$, so that the separating prism system $o^1$, $o^2$, $o^3$ separates two partial images of the sighting mark, the ray pencil systems of which are united independently of each other on the background of the eye to one image each through the two-hole diaphragm. At the same time the background of the eye itself is illuminated by the rays of the glow-lamp $w^3$, passing through the collective lens $w^2$, in such a way that there now serves as an entrance aperture for the illuminating rays into the eye the reduced real image of the two-hole diaphragm in the entrance pupil of the eye. The horizontal casing $u$ contains a telescope objective $u^1$, an observing ocular $u^2$ as well as an entrance diaphragm $u^3$, disposed in the focal plane of the system $g$, the aperture $u^5$ of this diaphragm being so chosen that in the pupil of the eye to be examined the rays serving for the observation run outside the ray pencil systems bounded by the two-hole diaphragm.

When the apparatus is in use, it is placed in front of the eye to be examined in such a manner that the optical axis of the apparatus coincides with the axis of the eye and the distance of the lens $c$ from the principal point of the eye is equal to the focal length of $c$. By thus placing the apparatus, the two-hole diaphragm $v^2$ and the diaphragm $u^3$ with the illuminating slit above are imaged in the pupil of the eye, so that objectionable reflections will not arise. Thereupon, after setting the rotatable observing part to the meridian, in which the measurement is to be made, the tube $d$ is displaced by rotating the disk $f^1$, until on the illuminated background of the eye the two partial images of the sighting mark coincide, i. e., that the part of the sighting mark appearing in the middle, window-shaped segment of the field of view and the outer partial image of the sighting mark are supplementary to a uniform line. If such be the case, the refractive value of the principal point sought of the examined eye can be read off on the scale $d^1$. Fig. 2 shows the image appearing in the field of view prior to being focussed, as it presents itself to both the observer and to the examined eye, in which case the observer notices simultaneously the illuminated background of the eye in the part of the field of view uncovered by the linear mark.

I claim:

1. In an apparatus for the objective measurement of the refractive value of the principal point of the eye to be examined a source of light, a sighting mark adapted to be illuminated by this source of light, an optical system adapted to present to the eye to be examined a virtual image of the said mark, a prism-system located in the path of the rays forming the said image and adapted to select two pencil systems out of these rays, a two-hole diaphragm arranged behind this prism-system and adapted to receive the said two pencils, and an instrument adapted for the observation of the retina of the eye to be examined.

2. In an apparatus for the objective measurement of the refractive value of the principal point of the eye to be examined a source of light, a sighting mark adapted to be illuminated by this source of light, an optical system adapted to present to the eye to be examined a virtual image of the said mark, a prism-system located in the path of the rays forming the said image and adapted to select two pencil systems out of these rays, the said optical system being adapted to form a real image of the said mark within the said prism system, a two-hole diaphragm arranged behind this prism-system and adapted to receive the said two pencils, and an instrument adapted for the observation of the retina of the eye to be examined.

3. In an apparatus for the objective measurement of the refractive value of the principal point of the eye to be examined a source of light, a sighting mark adapted to be illuminated by this source of light, an optical system adapted to present to the eye to be examined a virtual image of the said mark, the mark and at least a part of the said system being displaceable relatively to one another in the direction of the optical axis of the said system, a prism-system located in the path of the rays forming the said image and adapted to select two pencil systems out of these rays, a two-hole diaphragm arranged behind this prism-system and adapted to receive the said two pencils, and an instrument adapted for the observation of the retina of the eye to be examined.

4. In an apparatus for the objective measurement of the refractive value of the principal point of the eye to be examined a source of light, a dark straight-lined mark lying in the path of rays of this source of light, an optical system adapted to present to the eye to be examined a virtual image of the said mark, a prism-system located in the path of the rays forming the said image and comprising a surface, a part of which is adapted to reflect light, while the other part is pervious to light, these parts adjoining each other in a straight line, the said optical system being adapted to form a real image of the said mark on the said surface, crossing perpendicularly the said straight line, a two-hole diaphragm arranged behind this prism-system and adapted to receive the said two pencils, and an instrument adapted for the observation of the retina of the eye to be examined.

OTTO HENKER.